United States Patent Office 2,809,962
Patented Oct. 15, 1957

2,809,962

COBALT COMPLEX AZO DYESTUFF

Harlan B. Freyermuth, Easton, Pa., and Albert F. Strobel, Phillipsburg, N. J., assignors to General Aniline & Film Corporation, New York, N. Y., a corporation of Delaware No Drawing. Application October 30, 1953,
Serial No. 389,464

13 Claims. (Cl. 260—147)

This invention relates to the production of a novel cobalt complex compound and an azo dyestuff having the formula

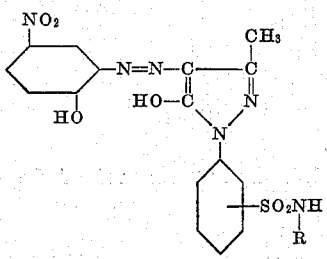

wherein R is selected from the group consisting of hydrogen and lower alkyl such as methyl, ethyl, butyl, and the like.

Recently there has arisen a demand for dyestuffs for textile fibers of extremely high light fastness, i. e., dyestuffs unaffected by 100 hours fadeometer exposure. This property, essential in fabrics employed for example in automobile upholstery and seat covers is particularly difficult to obtain when pastel shades are desired. In addition, it is highly desirable that such dyestuffs should be of good wash fastness, and sufficiently soluble in water to dye textile fibers with good exhaust from a neutral or weakly acidic aqueous dyebath. While many dyestuffs have been employed for the above purposes, they are usually deficient in one or more of the desired properties.

It has been found that cobalt complex compounds of the azo dyestuff above described possess the desired properties and may be employed to dye wool, nylon and other fibers from a neutral or weakly acidic dyebath with good exhaust to produce dyed fibers of exceptional light fastness and wash fastness.

The azo dyestuff precursor of this invention may be formed in known manner by diazotization of 2-amino-4-nitro-phenol followed by coupling the diazo compound with 1-(x-sulfamyl)phenyl-3-methyl-5-pyrazolone. The latter coupling component may be prepared by reacting m-nitrobenzene sulfonyl chloride with ammonia or an alkyl amine in accordance with the following formula:

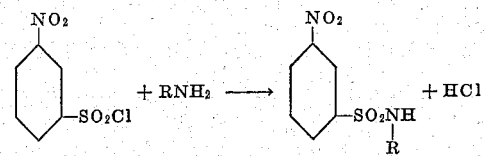

R having the values given above. The m-nitro-benzene sulfonamide is then reduced to the amine, converted to the hydrazine and condensed with ethyl aceto acetate to give the pyrazolone.

The azo dyestuff precursor may then be treated with an agent yielding cobalt in known manner in acid, neutral or alkaline medium with or without the use of pressure and/or elevated temperatures. As substances yielding cobalt there may be used for example the oxides, hydroxides or salts of cobalt with inorganic or organic acids, such as hydrochloric, sulfuric, sulfurous, hydrofluoric, formic, acetic, lactic, benzene sulfonic or stearic acids, or the like. The agent yielding cobalt may be used alone or in the presence of an additional substance which may or may not form a complex compound with the said agent, as for example, ammonia, pyridine, ethylene diamine, ethanolamine, formic acid, acetic acid, oxalic acid, aliphatic and aromatic hydroxy-containing compounds such as alcohol, glycerin, aliphatic hydroxy carboxylic acids such as tartaric, lactic and citric acids and the like, aromatic hydroxy carboxylic acids such as salicylic acid and the like, sugars, cellulose derivatives, phenols, tannins and lignins, and the like, soluble salts of sulfonic acids and carboxylic acids of the aliphatic, aromatic and hydroaromatic series, inorganic metal, alkali-metal and the alkaline earth metal salts, oxides and hydroxides and the like. Dispersing agents, solvents and other assistants may also be employed in the metallizing process.

The agent yielding cobalt may be applied in such manner that the resulting complex compound of the azo dyestuff contains less than one atom, or one atom, or more than one atom of cobalt. Thus, the resulting cobalt complex compound of the azo dyestuff may represent the complex union of one atom of cobalt with one molecule of the azo dyestuff precursor or one atom of cobalt with two molecules of the azo dyestuff precursor.

The cobalt complex azo dyestuff compounds of this invention are soluble in water and produce excellent results when employed for dyeing wool or nylon from a neutral or weakly acidic dyebath. It will of course be understood, however, that the dyestuffs of this invention may be employed for dyeing other materials such as silk, leather, cellulosic materials such as cotton, regenerated cellulose, paper and the like, cellulose esters and ethers, polyacrylonitrile, polyester and other synthetic fibers, and the like. They may also be employed for coloring natural or artificial resins and plastics in bulk, lacquers, and the like.

The following examples, in which parts are by weight unless otherwise indicated, are illustrative of the instant invention and are not to be regarded as limitative.

*Example 1*

97.0 grams (0.63 mole) 2-amino-4-nitrophenol were dissolved in 600 ml. water and 150 ml. 36% hydrochloric acid cooled to 20° C. There was added with stirring 145.2 ml. of 30% sodium nitrite solution (wt./vol.). The excess of nitrite was destroyed after 30 minutes stirring with 0.8 ml. of 10% sulfamic acid (wt./vol.). A coupling solution was prepared from 167.6 grams of 1-(3-sulfamyl phenyl)-3-methyl-5-pyrazolone, 650 ml. water, and 101 ml. 40% sodium hydroxide (wt./vol.) by heating to 90° C. until all had dissolved. The coupling solution was cooled to 20° C., then it was added dropwise to the diazo solution over a period of about 45 minutes. At the end of the addition heavy foaming occurred. After stirring for 1 hour the test for free diazo with resorcinol became negative. The volume was 2900 ml. There was added 45 ml. of 36% hydrochloric acid, changing the pH from 6.8 to 5.2. The precipitate was filtered off, and the presscake was packed down tightly. The cake was washed with 150 ml. water. Weight of wet presscake=722 grams.

*Example 2*

One-half of the above cake=361 grams (containing .315 mole of dye assuming 100% yield in diazotization and coupling) was slurried with 1 liter water and 12 ml. glacial acetic acid (pH=4.8 after adding the dye). There was added 130 g. anhydrous sodium acetate bringing the pH to 6.0. A solution of 37.6 grams cobaltous chloride hexahydrate (=0.158 mole) in 100 ml. water was then added. Volume=1700 ml. The slurry was heated at 90° C. on a steam bath for 6 hours keeping constant volume by adding water. The material first thickened at the beginning of the heated period and later became more fluid. The slurry was filtered. There was obtained a presscake weighing 431 grams. The presscake was reslurried with 1 liter of water, treated with 20 mls. 40% sodium hydroxide, then with 100 gms. salt, filtered and dried. The dyestuff thus produced contained by analysis one atom of cobalt in complex union with two molecules of the azo precursor. Stated otherwise, the product was a cobalt complex compound of the azo dyestuff precursor of the formula

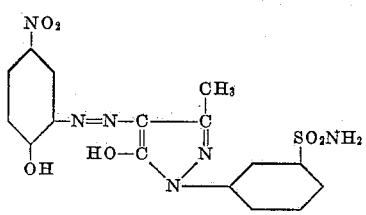

containing ½ atom of cobalt for each group in the azo dyestuff precursor molecule capable of forming a complex with cobalt.

A 10 g. piece of wool cloth was added to a dyebath containing 0.1 g. of the above dye and 300 ml. of water at room temperature together with 0.2 g. of concentrated sulfuric acid. The dyebath was heated to 190° F., and the temperature maintained for 1 hour, during which time the wool was worked in the solution. At the end of this period, the wool was removed, rinsed and dried. The cloth was dyed a beige shade. No fading occurred after 100 hours fadeometer exposure of this material. The dyeing showed very little loss in color on subjecting the material to severe wash tests.

*Example 3*

The process of Example 2 was repeated except that 75.2 g. cobaltous chloride hexahydrate (=0.316 mole) were used in place of the 37.6 g. used in Example 2. The temperature used in this example was 60° C., time of cobalting=1 hour. The dye was isolated in the same manner as in Example 2. The dye was somewhat less soluble than the dye of Example 2, giving heavier shades of wool with more complete exhaust. Light fastness and wash fastness of the dye of this example were practically equal to the dye of Example 2.

The cobalt complex azo dyestuff of this example contained 1 atom of cobalt for each group in the azo dyestuff precursor molecule capable of forming a complex with cobalt.

*Example 4*

The processes of Examples 1 and 2 were repeated except that an equimolecular proportion of 1-(4-sulfamylphenyl)-3-methyl-5-pyrazolone was used in place of the 1-(3-sulfamylphenyl)-3-methyl-5-pyrazolone employed in Example 1. The resulting cobalt complex compound of the azo dyestuff precursor of the formula

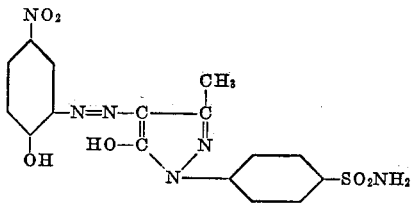

contained ½ atom of cobalt for each group in the azo dyestuff precursor molecule capable of forming a complex with cobalt, but was slightly more insoluble and less level dyeing on wool than the dyestuff of Example 2. Fastness properties were similar.

*Example 5*

The processes of Examples 1 and 2 were repeated except that an equimolecular proportion of 1-(3-N-methyl-sulfamylphenyl)-3-methyl-5-pyrazolone was employed in place of the 1-(3-sulfamylphenyl)-3-methyl-5-pyrazolone of Example 1. The resulting cobalt complex compound of the azo dyestuff precursor of the formula

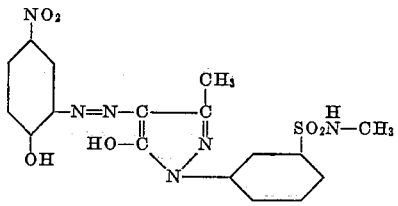

contained ½ atom of cobalt for each group in the azo dyestuff precursor molecule capable of forming a complex with cobalt and had properties similar to those of Example 2.

Various modifications and variations of this invention will be obvious to the person skilled in the art and it is to be understood that such modifications and variations are to be included within the purview of this application and the spirit and scope of the appended claims.

We claim:

1. A cobalt complex compound of the azo dyestuff having the formula

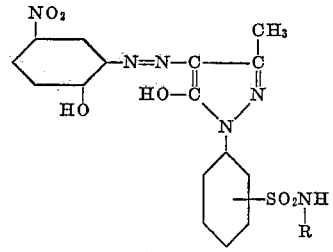

wherein R is selected from the group consisting of hydrogen and lower alkyl.

2. A compound as defined in claim 1 containing one-half atom of cobalt for each group in the azo dyestuff capable of forming a complex compound with cobalt.

3. A compound as defined in claim 1 containing one atom of cobalt for each group in the azo dyestuff capable of forming a complex compound with cobalt.

4. A cobalt complex compound of the azo dyestuff having the formula

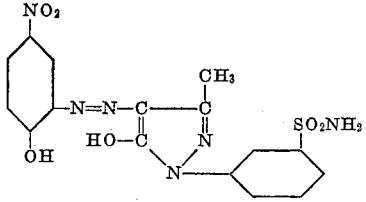

5. A compound as defined in claim 4 containing one-half atom of cobalt for each group in the azo dyestuff capable of forming a complex compound with cobalt.

6. A compound as defined in claim 4 containing one atom of cobalt for each group in the azo dyestuff capable of forming a complex compound with cobalt.

7. A cobalt complex compound of the azo dyestuff having the formula

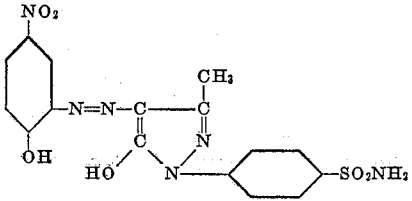

8. A compound as defined in claim 7 containing one-half atom of cobalt for each group in the azo dyestuff capable of forming a complex compound with cobalt.

9. A compound as defined in claim 7 containing one atom of cobalt for each group in the azo dyestuff capable of forming a complex compound with cobalt.

10. A cobalt complex compound of the azo dyestuff having the formula

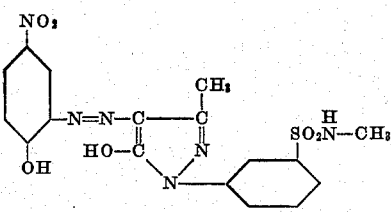

11. A compound as defined in claim 10 containing one-half atom of cobalt for each group in the azo dyestuff capable of forming a complex compound with cobalt.

12. A compound as defined in claim 10 containing one atom of cobalt for each group in the azo dyestuff capable of forming a complex compound with cobalt.

13. The complex cobalt compound containing one atom of cobalt in complex union with substantially two molecules of the monoazo dyestuff of the formula

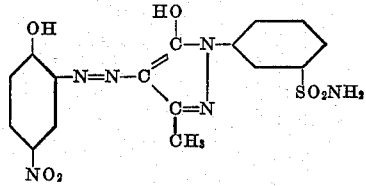

References Cited in the file of this patent
UNITED STATES PATENTS

| | | |
|---|---|---|
| 1,623,005 | Gubler et al. | Mar. 29, 1927 |
| 2,104,357 | Straub et al. | Jan. 4, 1938 |
| 2,443,226 | Carson | June 15, 1948 |
| 2,673,201 | Zickendraht et al. | Mar. 23, 1954 |